United States Patent
Kamiya

(10) Patent No.: US 7,283,898 B2
(45) Date of Patent: Oct. 16, 2007

(54) SEATING SENSOR SYSTEM, FAILURE STATE DETECTING METHOD USING SEATING SENSOR AND INDUSTRIAL VEHICLE WITH SEATING SENSOR SYSTEM

(75) Inventor: Kazushi Kamiya, Aichi-ken (JP)

(73) Assignee: Kabushiki Kaisha Toyota Jidoshokki, Kariya-shi (JP)

(*) Notice: Subject to any disclaimer, the term of this patent is extended or adjusted under 35 U.S.C. 154(b) by 253 days.

(21) Appl. No.: 10/819,460

(22) Filed: Apr. 6, 2004

(65) Prior Publication Data

US 2004/0239138 A1 Dec. 2, 2004

(30) Foreign Application Priority Data

May 27, 2003 (JP) ............................. 2003-149214

(51) Int. Cl.
*G06F 19/00* (2006.01)

(52) U.S. Cl. .................. 701/34; 296/68.1; 340/667; 180/272

(58) Field of Classification Search ............. 701/34; 296/68.1; 340/667; 180/272
See application file for complete search history.

(56) References Cited

U.S. PATENT DOCUMENTS

| 5,012,455 | A | * | 4/1991 | Schwarz et al. | ............... 367/93 |
| 5,790,031 | A | | 8/1998 | Shelton et al. | |
| 6,012,007 | A | | 1/2000 | Fortune et al. | |
| 6,092,976 | A | * | 7/2000 | Kamiya | ..................... 414/636 |
| 6,577,909 | B1 | * | 6/2003 | McGowan et al. | ........... 700/79 |
| 6,695,567 | B2 | * | 2/2004 | Nagata et al. | ............... 414/635 |
| 2003/0075969 | A1 | | 4/2003 | Fromme et al. | |
| 2003/0122669 | A1 | * | 7/2003 | Filippov et al. | ............ 340/563 |
| 2003/0160689 | A1 | * | 8/2003 | Yazdgerdi | ................ 340/457.1 |

FOREIGN PATENT DOCUMENTS

| EP | 1 295 759 A2 | | 3/2003 |
| JP | 08027870 A | * | 1/1996 |
| JP | 09127258 | | 5/1997 |
| JP | 2001087169 | | 4/2001 |

OTHER PUBLICATIONS

European Search Report dated Feb. 15, 2007 issued by European Patent Office for application No. 04008455.0-1264.

* cited by examiner

*Primary Examiner*—Thomas Black
*Assistant Examiner*—Marie A Weiskopf
(74) *Attorney, Agent, or Firm*—Morgan & Finnegan, L.L.P.

(57) ABSTRACT

A seating sensor detects whether a seat is occupied by a person. A microcomputer determines whether the seat is occupied by a person based on the output of the seating sensor. If a seating signal indicating that the seat is occupied by a person is supplied continuously for over a predetermined time, the microcomputer outputs an alarm signal indicating that the seating sensor system is in a failure state.

3 Claims, 5 Drawing Sheets

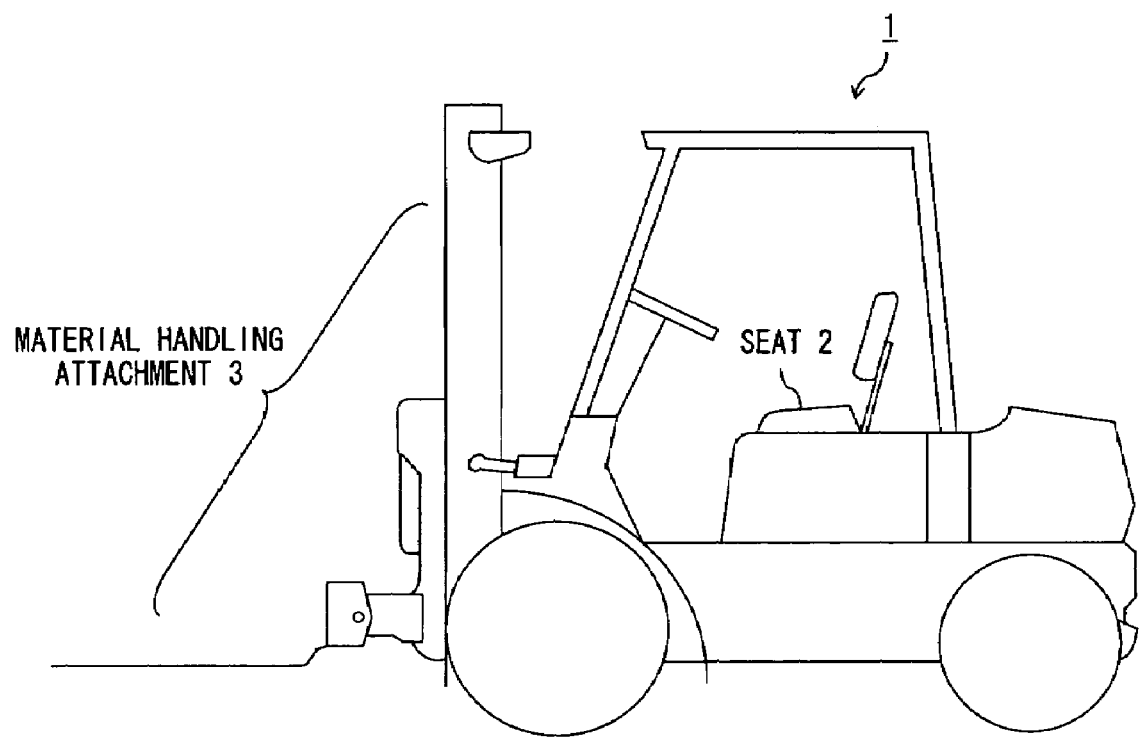
F I G. 1

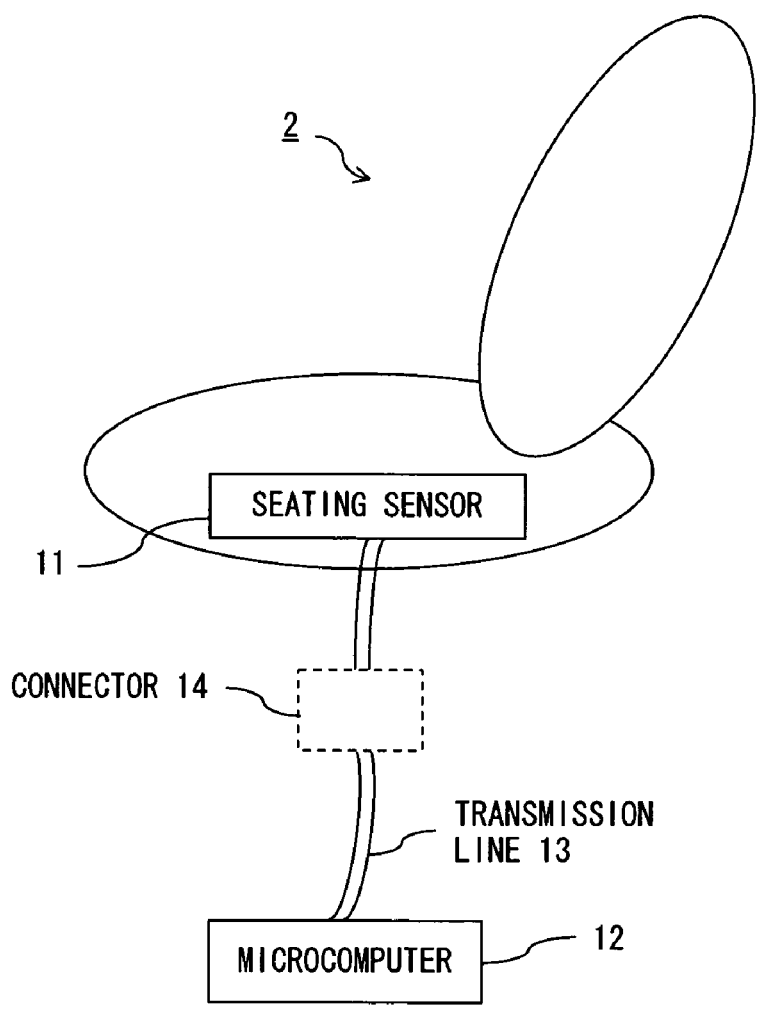
F I G. 2

SEATING SENSOR SYSTEM, FAILURE STATE DETECTING METHOD USING SEATING SENSOR AND INDUSTRIAL VEHICLE WITH SEATING SENSOR SYSTEM

BACKGROUND OF THE INVENTION

1. Field of the Invention

The present invention relates to a seating sensor system for determining whether the seat of a vehicle is occupied by a person, and an industrial vehicle provided with the seating sensor system.

2. Description of the Related Art

A vehicle (including a passenger car and an industrial vehicle) provided with a seating sensor system for determining whether a seat is occupied by a person is conventionally known. Such a seating sensor system comprises a switch to be turned on (or off) by the pressure on the seating place of a seat, and if a person sits on the seat, the switch is turned on (or off). Then, a vehicle is controlled based on the state of this switch. Specifically, for example, if it is determined that a seat is not occupied by a person, an air bag system corresponding to the seat is not operated.

As a technology for improving the accuracy of determining whether a seat is actually occupied by a person, a system which has pressure sensors not only in the seating place of a seat but also at the back of the seat is known (for example, see Patent Document 1). This system determines whether a seat is occupied by a person using those sensors.

Patent Document 1: Japanese Patent Publication No. 9-127258 (FIG. 4 and paragraph 0063)

However, in the conventional seating sensor system, if the switch or sensor fails or if a signal from the switch or sensor is not transmitted to a control device controlling a vehicle, it cannot be determined whether a seat is occupied by a person. In this case, when a seat is not occupied by a person, it is wrongly determined that the seat is occupied and the vehicle is controlled accordingly. Conversely, when the seat is actually occupied by a person, it is wrongly determined that the seat is not occupied and the vehicle is controlled accordingly.

In the configuration disclosed by the Patent Document 1, when one of the two sensors, one of which is located in the seating place and the other one of which is located at the back of the seat, fails, it can be detected the failure. However, if a plurality of sensors (or switches) is provided, it is difficult to realize the cost reduction of the entire seating sensor system. In addition, even in the configuration disclosed in the Patent Document 1, if a signal from the switch or sensor is not transmitted to the control device, there is no way of determining whether a seat is occupied by a person.

SUMMARY OF THE INVENTION

It is an object of the present invention to provide a seating sensor system for detecting a failure state by the simplest possible configuration.

The seating sensor system of the present invention determines whether a seat of a vehicle is occupied by a person. The system comprises a detection unit detecting whether the seat is occupied by a person and a control unit controlling the vehicle based on the output of the detection unit. The control unit outputs an alarm signal indicating that the seating sensor system is in a failure state if a seating signal indicating that the seat is occupied by a person is continuously supplied for over a predetermined specific time period.

Generally, it is very rare for the seat of a vehicle to be occupied continuously for over several hours. Thus, if a seating signal indicating that the seat is occupied by a person is continuously supplied for over a predetermined specific time, it can be predicted that there is some failure in the seating sensor system. Therefore, if such a seating signal is continuously supplied for over a predetermined specific time, the control unit outputs an alarm signal indicating that the seating sensor system is in a failure state. For this function, the failure of the seating sensor system can be detected by a simple configuration.

If in the seating sensor system, the detection unit is connected to the control unit by a transmission line, the seating signal can also be supplied to the control unit when the transmission line is disconnected. According to this configuration, if the transmission line is disconnected for some reason, the seating signal is continuously supplied and an alarm signal is outputted accordingly.

The industrial vehicle of the present invention comprises a material handling attachment and the above-mentioned seating sensor system. The vehicle further comprises a material handling prohibiting unit prohibiting the operation of the material handling attachment, if the alarm signal is outputted from the control unit of the seating sensor system.

The failure detecting method of the present invention detects a failure of a sensor system which determines whether the seat of a vehicle is occupied by a person. The method includes a step of outputting an alarm signal indicating that the seating sensor system is in a failure state, if a seating signal indicating that the seat is occupied by a person is continuously supplied for over a predetermined specific time. The function and effect of this method is basically the same as that of the above-mentioned seating sensor system.

BRIEF DESCRIPTION OF THE DRAWINGS

FIG. 1 shows an industrial vehicle adopting a seating sensor system according to the present invention;

FIG. 2 shows the configuration of the seating sensor system;

DESCRIPTION OF THE PREFERRED EMBODIMENTS

Figure 3A:
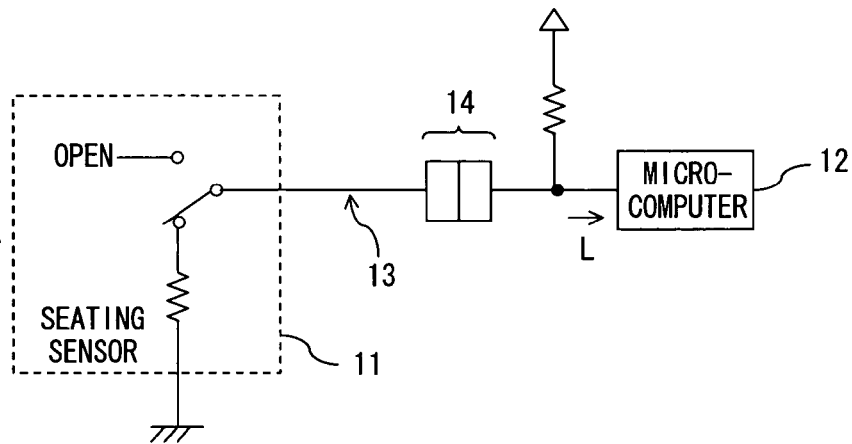
FIGS. 3A through 3C explain the function of a seating signal.

The preferred embodiments of the present invention is described below with reference to the drawings.

FIG. 1 shows the appearance of an industrial vehicle provided with a seating sensor system according to the present invention. In this example, a forklift 1 is described as an example of an industrial vehicle.

In FIG. 1, a operator (driver) that operates the forklift 1 basically sits on seat 2 when running it. The forklift 1 comprises a material handling attachment 3 which handles materials (cargos). The operator also basically sits on seat 2, when operating the material handling attachment 3.

The forklift 1 comprises a seating sensor system. As shown in FIG. 2, the seating sensor system comprises a seating sensor (detector or detecting unit) 11 and a microcomputer (controller or control unit) 12.

The seating sensor 11 detects whether seat 2 is occupied by a person (that is, the operator of the forklift 1). Here, the seating sensor is not limited to a specific one, but it comprises, for example, the following components:

(1) A switch whose conductive contact is mechanically closed when weight equal to or more than a specific value is imposed on the seat 2
(2) A switch whose conductive contact is mechanically opened when weight equal to or more than a specific value is imposed on the seat 2
(3) A pressure sensor detecting the weight imposed on the seat 2

If the seating sensor 11 detects that the seat 2 is occupied by the operator, it outputs a seating signal indicating the fact. Here, the seating signal is not limited to a specific one, but it can be, for example, a binary signal indicating whether the seat 2 is occupied. In this case, the binary value can be expressed by a voltage value or a current value. In any ways, as long as the microcomputer 12 can recognize the state where the seat 2 is occupied by the operator, any signal can be used as a seating signal.

The seating sensor 11 may be connected to the microcomputer 12 by a transmission line 13 through a connector 14. In this case, the transmission line 13 is not limited to a specific one, however, it can be, for example, a harness.

Figure 3B:
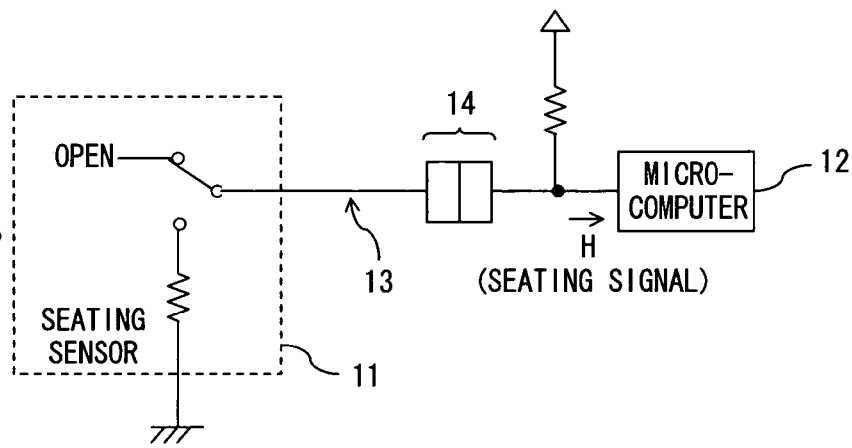
Figure 3C:
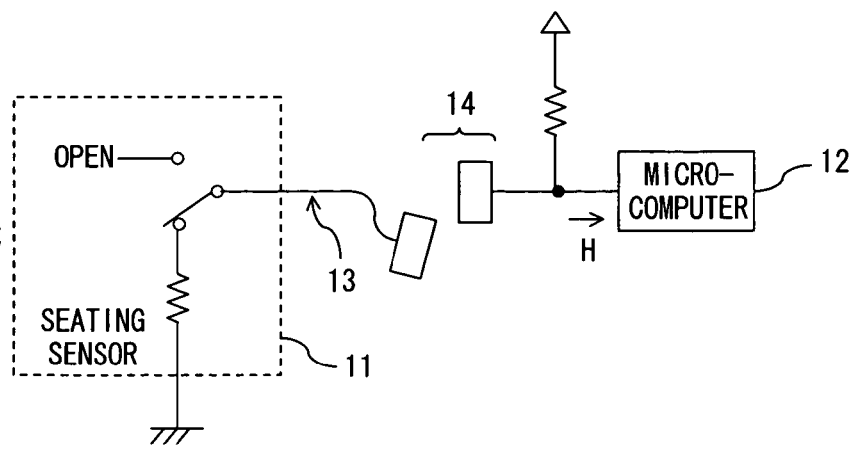

FIGS. 3A through 3C explain the function of the seating signal. In this example, a switch whose conductive contact is mechanically opened when weight more than a specific value is imposed on seat 2 is used.

As shown in FIG. 3A, if the seat 2 is not occupied by the operator, the seating sensor 11 is closed, and "L" is supplied to the microcomputer 12. On the other hand, as shown in FIG. 3B, if the seat 2 is occupied by the operator, the seating sensor 11 is opened, and "H" is supplied to the microcomputer 12. Here, in this embodiment, this H-level signal corresponds to a "seating signal". Specifically, if the H-level signal (that is, the seating signal) is supplied to the microcomputer 12, it is recognized that the seat 2 is occupied by the operator.

However, as shown in FIG. 3C, if the connector 14 is disconnected or if the transmission line 13 is disconnected, an H-level signal is supplied to the microcomputer 12, which is the same as a case shown in FIG. 3B, even if the seat 2 is not occupied by the operator. Then, the microcomputer 12 determines that it has received the seating signal and wrongly recognizes that the seat 2 is occupied by the operator. That is to say, the microcomputer 12 makes a wrong decision. In addition, when the seating sensor 11 fails, the same wrong determination is also made, which is not shown in drawings.

The seating sensor system of the present invention can avoid such a wrong determination. The function to avoid such a wrong determination is mainly realized by the microcomputer 12.

Figure 4:
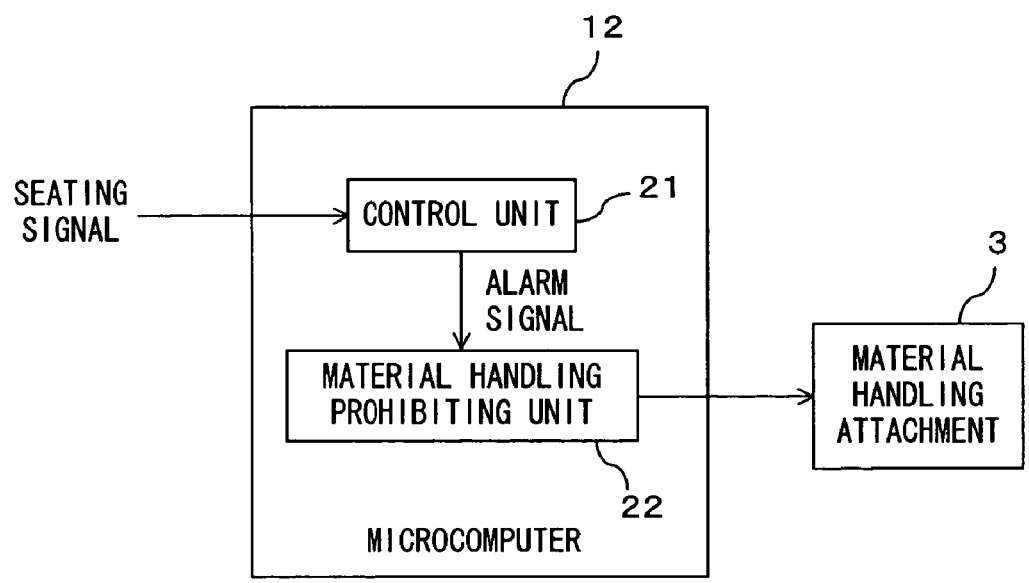
FIG. 4 shows the functions provided by a microcomputer.

FIG. 4 shows a function provided by the microcomputer 12. The microcomputer realizes a control unit (controller or control unit) 21 and a material handling prohibiting unit 22 by executing a program described in advance.

Figure 5:
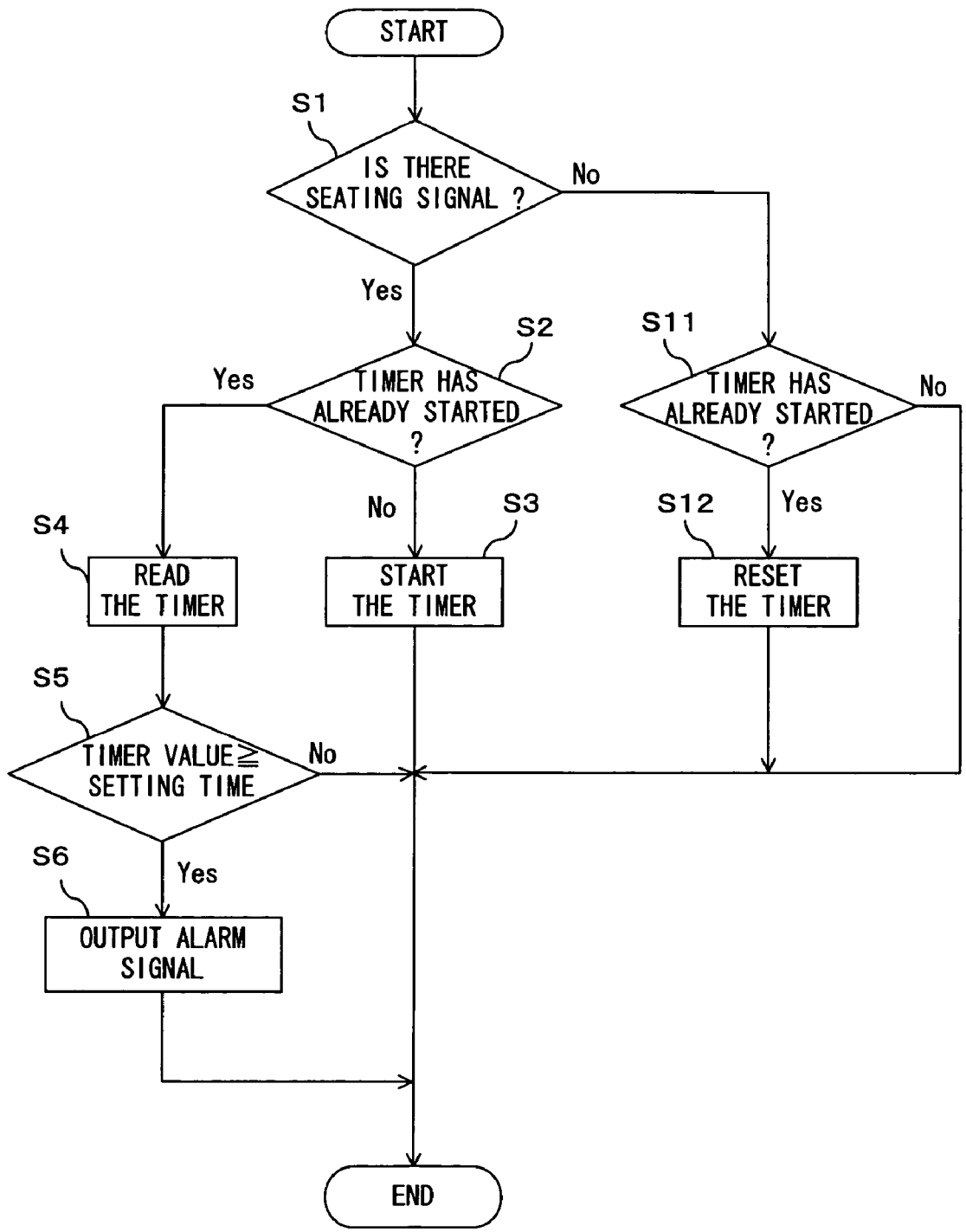
FIG. 5 is a flowchart showing the operation of the control unit.

FIG. 5 is a flowchart showing the operation of the control unit 21. The process shown in this flowchart is, for example, repeatedly performed at predetermined time interval.

In step S1, it is checked whether there is a seating signal. For example, in FIGS. 3A through 3C, it is checked whether "H" is received. If there is the seating signal, steps S2 through S6 are executed. On the other hand, if there is no seating signal, steps S11 and S12 are executed.

In step S2, it is checked whether a timer for counting a seating time has already started. This timer is, for example, built in the microcomputer 12. If this timer has not yet started, the timer is started in step S3.

If the timer has already started, the timer value at this timing is read in step S4. Then, in step S5, the timer value read in step S4 is compared with a predetermined threshold time (predetermined time). If this timer value exceeds the threshold time, an alarm signal is outputted in step S6.

If there is no seating signal ("No" in step S1), it is checked whether the timer has already started in step S11. Then, if the timer is already started, the timer is reset and stopped in step S12.

As described above, the control unit 21 monitors whether there is a seating signal. Then, if the seating signal is supplied continuously for over the threshold time period, the control unit 21 outputs the alarm signal. In this case, the control unit 21 recognizes that the seat 2 is occupied by the operator as long as the seating signal is supplied. In other words, the control unit 21 substantially monitors a time period when the seat 2 is continuously occupied by the operator.

As the threshold time period, certain time period longer than the expected upper limit where the seat 2 is continuously occupied by the operator of the forklift 1 is used. Generally, the seat 2 is not always occupied by the operator of the forklift 1. In other words, the operator often gets off the vehicle and works outside (for example, inspects cargos, loads/unloads them on/off a shelf or etc.,). It is often regulated that rest should be given to the operator at intervals of specific time periods. Alternatively, the operator sometimes gets off the vehicle temporarily for physiological reasons and the like. For these reasons, it is very rare for the seat 2 to be occupied continuously for several hours by the operator of the forklift 1. Therefore, if the seating signal indicating that the seat 2 is occupied by the operator is supplied continuously for several hours, the microcomputer 12 determines that there is some failures in the seating sensor system.

The threshold time period is determined from such a point of view, and is set to, for example, approximately two to four hours.

Upon receipt of the alarm signal from the control unit 21, the material handling prohibiting unit 22 prohibits the operations of the material handling attachment 3. Specifically, upon receipt of the alarm signal, for example, the material handling prohibiting unit 22 performs a prohibition control in such a way that the material handling attachment 3 does not operate even if the operator of the forklift 1 instructs the material handling attachment 3 to bring up or down the lift by its lever operation. For example, if the lift is brought up and down by a motor, this prohibition control can be realized by stopping the power supply to the motor.

When the seating signal is supplied to the microcomputer 12 and the alarm signal is not outputted from the control unit 21, the material handling prohibiting unit 22 determines that the seat 2 is actually occupied by the operator, and if the operator instructs the material handling attachment to operate, it transmits the instruction to the material handling attachment 3. On the other hand, when no seating signal is supplied to the microcomputer 12, the material handling prohibiting unit 22 determines that the seat 2 is not occupied by the operator and performs a prohibition control in such a way that the material handling attachment 3 does not operate.

As described above, according to the seating sensor system of the embodiment, if the seating signal is supplied to the microcomputer 12 continuously for a longer time than the threshold time period, it is determined that there is some failures, such as the failure of the seating sensor 11, no transmission of a signal between the seating sensor and the microcomputer 12 or the like, and outputs the alarm signal. Therefore, even if the seating sensor system is not redundantly configured, system failure can be detected. In other words, without modifying the mechanical configuration of an existing system, a failure detecting function can be realized simply by adding or modifying a software program executed by the microcomputer.

In addition, since the operation of the material handling attachment 3 is prohibited while the alarm signal is outputted, the abnormal operation of the forklift can be avoided. Here, some forklifts are designed in such a way that the material handling attachment 3 cannot be operated while the seat 2 is not occupied by the operator. However, some operators sometimes make lever operations without sitting on the seat 2. And this kind of abnormal operations can be realized by, for example, intentionally disconnecting the connector 14, as shown in FIG. 3C. In this case, according to the seating sensor system of this embodiment, if the operator disconnects the connector 14 in order to perform such an abnormal operation, that is, if the function of the seating sensor system is deactivated in order to perform such an abnormal operation, the material handling attachment 3 cannot be operated as long as the microcomputer 12 operates normally. Therefore, the abnormal operation of the forklift can be properly prohibited.

Although in the above-mentioned embodiment, as shown in FIGS. 3A through 3C, a switch that is opened when the seat 2 is occupied by a person is used, a switch that is closed when the seat 2 is occupied by a person, a pressure sensor or the like can also be used as a seating sensor.

Although in the above-mentioned embodiment, the operation of the material handling attachment 3 is prohibited when the alarm signal is outputted, this alarm signal can also be used for another purpose. For example, when the alarm signal is outputted, the running of the forklift can also be prohibited.

Furthermore, although in the above-mentioned embodiment, the seating sensor system of the present invention is mounted on the forklift, it can also be applied to another industrial vehicle or on a general-purpose vehicle (including a passenger car). However, if it is applied to another vehicle, the above-mentioned "threshold time period" must be determined base on an environment where it is used.

According to the present invention, the failures of the seating sensor system can be detected by a simple configuration. In addition, not only the failure of the seating sensor, but the failure that a signal is not transmitted from the seating sensor to the control device can also be detected.

What is claimed is:

1. A seating sensor system for determining whether a seat of a vehicle is occupied by a person, comprising:
    a detector which detects whether the seat is occupied by a person;
    a controller which controls the vehicle based on an output of said detector;
    a first signal line connected to said detector;
    a second signal line connected to said controller;
    a set of connectors which connects said first and second signal lines; and
    a pull-up circuit which connects said second signal line to a voltage source supplying dc voltage, wherein
    said detector comprises a switch for making said first signal line open when the seat is occupied by a person, and for making said first signal line grounded when the seat is not occupied by a person,
    said controller outputs an alarm signal indicating that the sensor system is in a failure state when voltage of said second signal line is continuously higher than a threshold voltage for over a predetermined time period.

2. An industrial vehicle which has a seat for an operator of the industrial vehicle and a seating sensor system for determining whether the seat is occupied by a person, the sensor system comprising:
    a detector which detects whether the seat is occupied by a person;
    a controller which controls the vehicle based on an output of the detector;
    a first signal line connected to the detector;
    a second signal line connected to the controller;
    a set of connectors which connects the first and second signal lines; and
    a pull-up circuit which connects the second signal line to a voltage source supplying dc voltage,
    wherein the detector comprises a switch for making the first signal line open when the seat is occupied by a person and for making the first signal line grounded when the seat is not occupied by a person, and the controller outputs an alarm signal indicating that the sensor system is in a failure state when voltage of said second signal line is continuously higher than a threshold voltage for over a predetermined time period.

3. The industrial vehicle according to claim 2, further comprising:
    a material handling attachment; and
    a material handling prohibiting unit which prohibits an operation of the material handling attachment when the alarm signal is output from the controller.

* * * * *